SAMUEL W. PHELPS.
Improvement in Fruit Boxes.
No. 121,412.  Patented Nov. 28, 1871.
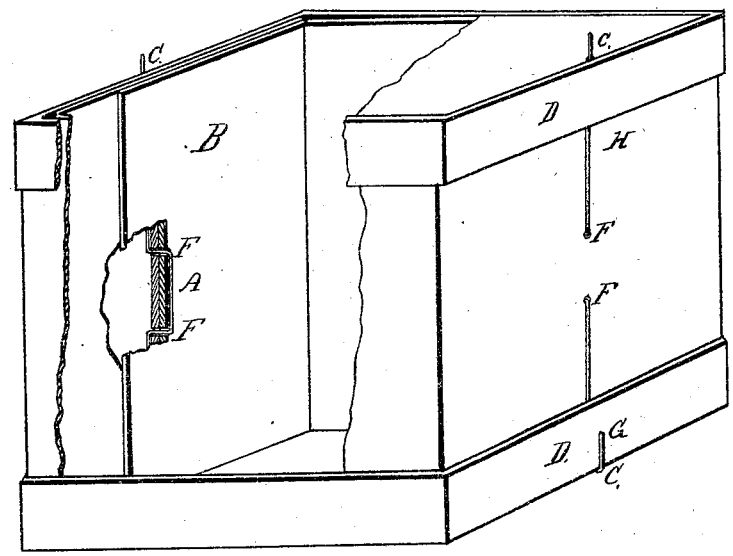
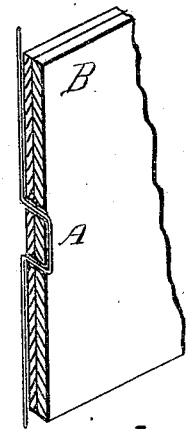
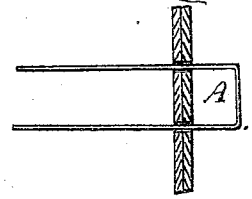
Witnesses
Augustus C. Means
Benjamin F. Lee
Inventor:
Samuel W. Phelps 121,412

UNITED STATES PATENT OFFICE.

SAMUEL W. PHELPS, OF SANDUSKY, OHIO.

IMPROVEMENT IN FRUIT-BOXES.

Specification forming part of Letters Patent No. 121,412, dated November 28, 1871.

*To all whom it may concern:*

Be it known that I, SAMUEL W. PHELPS, of Sandusky City, in the county of Erie, in the State of Ohio, have invented an Improved Grape-Box, of which the following is a specification:

My invention relates to the fastening or securing the tops and bottoms, or covers, to the body of the box by means of wires made into loops; and to the fastening of the sides of the box by means of a clasp made from the wires that secure the covers.

Without my devices, or similar ones, nails, tacks, or brads have to be used to fasten on the covers and secure the side of the box. When fastened with nails the box is generally ruined by opening it, and the fruit injured; whereas when fastened by my devices the covers can be taken off and put on again without injury to the box or fruit.

In the accompanying drawing, Figure 1 represents the box completed with a portion cut away, so as to show the method of securing the side B with the wire clasp A. Fig. 2 represents a perspective view of a section of the side of the box marked B and fastened by the clasp A. Fig. 3 represents the way, in which the wire is bent for use.

In the sides and in the covers of the box, as represented in Fig. 1, small holes are made at the points F F F F and C C C C. I then take a piece of wire about an inch longer than the height of the box and bend this wire into the shape of a common staple, as represented in Fig. 3. The ends of this bent wire are then inserted in the holes marked F F F F from the inside of the box; both ends of the wire are then drawn tightly on the outside of the box, thus forming braces or clasps on the inside of the box, and fastening the side B with the clasp A, as represented in Fig. 1. The wires now projecting from the holes F F F F are bent, the upper one toward the top and the lower one toward the bottom of the box, and resting against the sides of the box B H. The ends of the wires now extend about one-half inch above and one-half inch below the sides of the box marked B H. The covers are now so placed upon the box that these projecting wires shall pass through the covers at the points C C C C. The ends of the wires are then bent outward and make a clasp that fastens the covers, as represented by G. We have thus securely fastened, by means of the wires made into loops, the top and bottom or covers of the box, as represented by D D, and by means of the clasp A the side B where the ends lap.

What I claim as my improvement and invention in combination with a fruit-box is—

The wire loop and fastening A A and C C, constructed as shown, for the purpose described.

SAMUEL W. PHELPS.

Witnesses:
AUGUSTUS C. MEANS,
BENJAMIN F. LEE.

(63)